United States Patent
Adar et al.

(10) Patent No.: US 10,296,253 B2
(45) Date of Patent: *May 21, 2019

(54) COORDINATION OF SPARE LANE USAGE BETWEEN LINK PARTNERS

(71) Applicant: International Business Machines Corporation, Armonk, NY (US)

(72) Inventors: Etai Adar, Haifa (IL); Yiftach Benjamini, Haifa (IL); Pavel Granovsky, Haifa (IL)

(73) Assignee: International Buiness Machines Corporation, Armonk, NY (US)

( * ) Notice: Subject to any disclaimer, the term of this patent is extended or adjusted under 35 U.S.C. 154(b) by 186 days.

This patent is subject to a terminal disclaimer.

(21) Appl. No.: 15/089,167

(22) Filed: Apr. 1, 2016

(65) Prior Publication Data

US 2016/0217026 A1    Jul. 28, 2016

Related U.S. Application Data

(63) Continuation of application No. 14/267,135, filed on May 1, 2014, now Pat. No. 9,354,990.

(Continued)

(51) Int. Cl.
*G06F 3/06*     (2006.01)
*G06F 11/20*    (2006.01)
(Continued)

(52) U.S. Cl.
CPC ........ *G06F 3/0635* (2013.01); *G06F 11/2002* (2013.01); *G06F 11/2007* (2013.01); *G06F 11/221* (2013.01); *H04L 69/324* (2013.01)

(58) Field of Classification Search
CPC .. G06F 11/20; G06F 11/2002; G06F 11/2007; G06F 11/201; G06F 11/2017;
(Continued)

(56) References Cited

U.S. PATENT DOCUMENTS 5,020,081 A    5/1991  Allen et al.
7,412,642 B2   8/2008  Cypher
(Continued)

FOREIGN PATENT DOCUMENTS

CN    1423458 A    6/2003
CN    1501642 A    6/2004
(Continued)

OTHER PUBLICATIONS

International Search Report and Written Opinion of the ISA dated Dec. 16, 2014—International Application No. PCT/CN2014/086272.

*Primary Examiner* — Gabriel Chu
(74) *Attorney, Agent, or Firm* — Isaac J. Gooshaw

(57) ABSTRACT

Various examples of techniques for identifying a corrupt data lane and using a spare data lane are described herein. Some examples include a system of coordinating spare lane usage between link partners. One such example comprises analyzing data from a link partner to identify a corrupt lane, and communicating the corrupt lane to the link partner, wherein the communication does not require sideband communication channel. In some embodiments, communicating the corrupt lane to the link partner comprises identifying a transmit lane corresponding to the corrupt lane, transmitting a set of data intended for a corresponding transmit lane using a spare data lane, and transmitting bad data to the link partner using the corresponding transmit lane.

12 Claims, 9 Drawing Sheets

Related U.S. Application Data

(60) Provisional application No. 61/876,636, filed on Sep. 11, 2013.

(51) Int. Cl.
*G06F 11/22* (2006.01)
*H04L 29/08* (2006.01)
*G06F 11/00* (2006.01)

(58) Field of Classification Search
CPC .............. G06F 11/221; G06F 11/2221; G06F 11/3037; G06F 11/3041; G06F 3/0629; G06F 3/0635
See application file for complete search history.

(56) References Cited

U.S. PATENT DOCUMENTS

| | | |
|---|---|---|
| 7,844,767 B2 | 11/2010 | Cherukuri et al. |
| 8,082,474 B2 | 12/2011 | Ferraiolo et al. |
| 8,090,976 B2 | 1/2012 | Maciver et al. |
| 8,332,729 B2 | 12/2012 | Sivaramakrishnan et al. |
| 9,258,082 B2 | 2/2016 | Lusted et al. |
| 2003/0021227 A1 | 1/2003 | Lee et al. |
| 2003/0058888 A1 | 3/2003 | Shinoda |
| 2003/0065811 A1 | 4/2003 | Lin et al. |
| 2003/0117961 A1 | 6/2003 | Chuah et al. |
| 2009/0106636 A1 | 4/2009 | Jenkins et al. |
| 2010/0060310 A1 | 3/2010 | Laisne et al. |
| 2010/0295600 A1 | 11/2010 | Kim et al. |
| 2011/0320881 A1 | 12/2011 | Dodson et al. |
| 2013/0159587 A1 | 6/2013 | Nygren et al. |
| 2014/0177626 A1 | 6/2014 | Thottethodi et al. |
| 2015/0193316 A1* | 7/2015 | Dreps .................. G06F 11/24 714/4.5 |

FOREIGN PATENT DOCUMENTS

| | | |
|---|---|---|
| CN | 1615603 A | 5/2005 |
| CN | 1764132 A | 4/2006 |
| WO | 2010000621 | 1/2010 |

* cited by examiner

300

COORDINATION OF SPARE LANE USAGE BETWEEN LINK PARTNERS

This continuation application claims the benefit of U.S. Non-Provisional Application Ser. No. 14/267,135, which claims the benefit of U.S. Provisional Application 61/876,636, which is incorporated by reference herein in its entirety.

BACKGROUND

The present invention relates to corrupt data lane identification and more specifically, but not exclusively, to coordinating spare lane usage between link partners without the use of side-band communication channels.

In some examples, link partners can transmit data from a Hybrid Memory Cube (also referred to herein as HMC). A Hybrid Memory Cube is a Dynamic Random Access memory (DRAM) memory architecture that combines high-speed logic process technology with a stack of through-silicon-via (TSV) bonded memory die. HMC was designed for improved performance and bandwidth, as well as increased power efficiency.

SUMMARY

An aspect of the invention is a system for coordinating spare lane usage between link partners. One embodiment of this system comprises analyzing data from a link partner to identify a corrupt lane, and communicating the corrupt lane to the link partner, wherein the communication does not require sideband communication channel. In some embodiments, communicating the corrupt lane to the link partner comprises identifying a transmit lane corresponding to the corrupt lane, transmitting a set of data intended for the corresponding transmit lane using a spare data lane, and transmitting bad data to the link partner using the corresponding transmit lane.

Another aspect of the invention is a system coordinating spare lane usage between link partners. One embodiment of this system comprises receiving a first set of data from a data link partner on a plurality of data lanes, detecting a corrupt receive line in the plurality of data lanes, and identifying the corrupt receive line to the data link partner using the plurality of data lines. In some embodiments, identifying the corrupt receive line to the data link partner comprises identifying a transmit lane corresponding to the corrupt data line, transmitting a set of data intended for the corresponding transmit lane using a spare data line, and transmitting corrupted data to the data link partner using the corresponding transmit line.

Another aspect of the invention is a system comprising a requester module, and a responder module communicatively coupled to the requestor module by a plurality of data lines. In some embodiments, the requestor module and the responder module are further adapted to analyze signals on the plurality of data lines to identify a corrupt receive lane; and in response to the identifying: transmit a set of data intended for the corrupt lane using a spare data lane and transmit bad data using the corrupt lane.

Another aspect of the invention is a system, comprising a first link partner communicatively coupled to a second link partner. In some embodiments, the first link partner is adapted to analyze data received from the second link partner to identify a corrupt receive lane, and communicate the corrupt receive lane to the second link partner, wherein the communication does not require sideband communication channel. Another embodiment comprises a design structure tangibly embodied in a machine readable medium for designing, manufacturing, or testing this system.

Another aspect of the invention is a system, comprising a first link partner communicatively coupled to a second link partner. In some embodiments, the first link partner is adapted to receive a first set of data from the second data link partner on a plurality of data lanes, detect a corrupt line in the plurality of data lanes, and identify the corrupt line to the second data link partner using the plurality of data lines. Another embodiment comprises a design structure tangibly embodied in a machine readable medium for designing, manufacturing, or testing this system.

DETAILED DESCRIPTION

Figure 1:
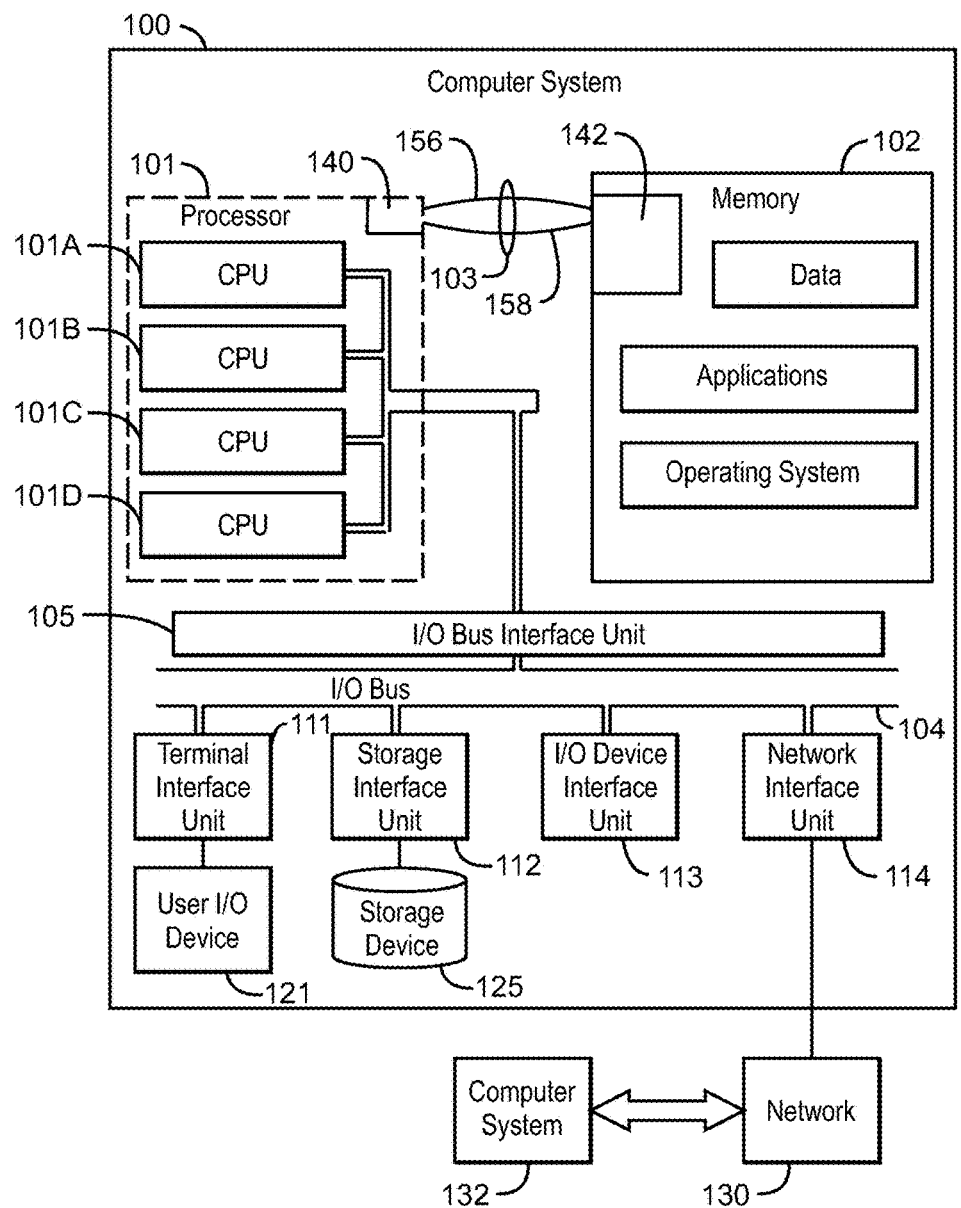
FIG. 1 is an example of a computing device that can identify a corrupt data lane and use a spare data lane.

Many computing devices use an initialization process to determine if data packets transmitted between various hardware components are reliable. For example, a requester hardware component of a computing device may transmit a set of bits with the same value for a period of time. A responder hardware component within the computing device may receive the set of bits from the requester hardware component. The responder hardware component may determine that the received set of bits have the same value and determine that the system interconnect used to transmit the bits is reliable. If one or more of the bits transmitted between the receiving hardware component and the sending hardware component has a different value, the receiving hardware component can determine that the system interconnect is corrupt.

A corrupt data lane, as referred to herein, generally includes any suitable data lane within any suitable system interconnect that modifies the value of at least one bit during transmission at least some of the time. For example, a corrupt data lane may include a data lane that modifies bits with 'zero' values to bits with 'one' values or modifies bits with 'one' values to bits with 'zero' values. Thus, the data received from a corrupt data lane may not be reliable.

In some embodiments, a spare lane is provided in each communication direction to add robustness to the system (i.e., per simplex linx). A spare data lane, as referred to herein, generally refers to any suitable data lane within any suitable system interconnect that can transmit data, but may not transmit data by default. For example, a spare data lane may be used to transmit data using data protocols, or may be used to transmit data in response to the detection of a corrupt data lane. According to some embodiments described herein, the computing device can detect that the spare data lane exists in response to detecting a corrupt data lane and then shift communication to that spare lane. Thereafter, the computing device can continue operation using the spare data lane.

In operation, if one link partner identifies a corrupt lane, it can shift its data to the spare lane. However, this switch can also be communicated to its link partner so that that partner can properly interpret the data it receives. Accordingly, some embodiments define a handshake between the link partners during the link bring up that allows the link partner that identifies a corrupted link to signal the spare lane configuration to the other side. More specifically, once a link partner identifies a dead receiver (also referred to herein as RX) lane, it can both begin utilizing its own transmitter (also referred to herein as TX) spare lane and stop transmitting valid data on the TX lane equivalent to the dead lane. This, in turn, can cause the NULL identifying logic on the other side of the link to suddenly fall out of sync on its RX lane equivalent to the dead lane, which causes that party to also shift its TX and RX logic to the spare lane. In this way, both sides can begin utilizing their spare lanes and shutting down the dead lane. Advantageously, these embodiments can perform this handshake without using a side band communication channel, such as I2C.

Referring to the Drawings, wherein like numbers denote like parts throughout the several views, FIG. 1 depicts a high-level block diagram representation of a computer system embodiment 100 that can identify a corrupt data lane and coordinate use a spare data lane. However, the mechanisms and apparatus of embodiments described herein apply equally to any appropriate computing system, such as a server computer, a computing phone, laptop computer, desktop computer, or tablet computer, among others. The components of the computer system 100 comprise one or more processors 101, memory 102, a terminal interface unit 111, a storage interface unit 112, an I/O (Input/Output) device interface unit 113, and a network interface unit 114, all of which are communicatively coupled, directly or indirectly, for inter-component communication via a memory bus 103, an I/O bus 104, and an I/O bus interface unit 105. In some embodiments, the processor 101 and/or the memory 102 include a requestor module 140 coupled to a responder module 142 by a downstream data link 156 and an upstream data link 158.

In some embodiments, the processor 101 and the memory 102 can transmit data encapsulated in packets using the downstream data link 156 and an upstream data link 158. The downstream data link 156 and the upstream data link 158 can include any suitable number of data lanes and can transmit data simultaneously. For example, the downstream data link 156 and the upstream data link 158 may each include sixteen data lanes and each data lane may transmit data simultaneously. The data lanes of the downstream data link 156 and the upstream data link 158 are described in further detail below. In some examples, the processor 101 may transmit data to the memory 102 through the requester module 140, which can separate data or a request for data into packets and send the packets through the data lanes in the downstream data link 156. The memory 102 may receive the data packets in the responder module 142, which can parse and evaluate the data packets received from the requester module 140. In some examples, the responder module 142 may also return requested data to the requester module 140 through the upstream data link 158. In some embodiments, the upstream data link 158 and downstream data link 156 can use any suitable system interconnect protocol such as the hybrid memory cube specification, among others.

The computer system 100 comprises one or more general-purpose programmable central processing units (CPUs) 101A, 101B, 101C, and 101D, herein generically referred to as the processor 101. In an embodiment, the computer system 100 comprises multiple processors typical of a relatively large system; however, in another embodiment the computer system 100 may alternatively be a single CPU system. Each processor 101 executes instructions stored in the memory 102 and may comprise one or more levels of on-board cache.

In an embodiment, the memory 102 may comprise a random-access semiconductor memory, storage device, or storage medium (either volatile or non-volatile) for storing or encoding data and programs. In another embodiment, the memory 102 represents the entire virtual memory of the computer system 100, and may also include the virtual memory of other computer systems coupled to the computer system 100 or connected via the network 130. The memory 102 can be a single monolithic entity, but in other embodiments the memory 102 is a more complex arrangement, such as a hierarchy of caches and other memory devices. For example, memory may exist in multiple levels of caches, and these caches may be further divided by function, so that one cache holds instructions while another cache holds non-instruction data, which is used by the processor 101 or processors 101A, 101B, 101C, and 101D. Memory 102 may be further distributed and associated with different CPUs or sets of CPUs, as is known in any of various so-called non-uniform memory access (NUMA) computer architectures.

The requestor module 140 and the responder module 142 are illustrated as being integrated into the processor 101 and the memory 102. In other embodiments, however, the requestor module 140 and/or the responder module 142 may be implemented, in whole or in part, as separate, discrete hardware components, as software components stored on the system 100, or even different computer systems in which the requestor module 140 and the responder module 142 are accessed remotely, e.g., via the network 130. Thus, while requestor module 140 and the responder module 142 are illustrated as residing in the processor 101 and memory 102, these elements are not necessarily all completely contained in the same component.

In an embodiment, the requestor module 140 and the responder module 142 are implemented in hardware via logic gates, semiconductor devices, chips, circuits, circuit cards, and/or other physical hardware devices that conform to the HMC Specification 1.0. In other embodiments, the requestor module 140 and the responder module 142 may be implemented in microcode or firmware, and/or as instructions that execute on the processor 101 or statements that are interpreted by instructions executing on the processor 101 to perform the functions as further described below. In still other embodiments, the functionality may be implemented with an application specific integrated circuit, in the logic implemented in a memory device, or logic implemented in an embedded controller, among others.

The memory bus 103 provides a data communication path or communications fabric for transferring data among the processor 101, the memory 102, and the I/O bus interface unit 105. The I/O bus interface unit 105 is further coupled to the I/O bus 104 for transferring data to and from the various I/O units. The I/O bus interface unit 105 communicates with multiple I/O interface units 111, 112, 113, and 114, which are also known as I/O processors (IOPs) or I/O adapters (IOAs), through the I/O bus 104.

The I/O interface units support communication with a variety of storage and I/O devices. For example, the terminal interface unit 111 supports the attachment of one or more user I/O devices, which may comprise user output devices (such as a video display device, projectors, a speaker, and/or television set) and user input devices (such as a microphone and a speech recognition device, a gesture detection device, a camera, a keyboard, a mouse, a keypad, a touchpad, a trackball, buttons, Radio Frequency Identifier Tags, a light pen, a finger, a stylus, or other pointing device). A user may manipulate the user input devices using a user interface, in order to provide input data and commands to the user I/O device 121 and the computer system 100, and may receive output data via the user output devices. For example, a user interface may be presented via the user I/O device 121, such as displayed on a display device. The user I/O device 121 may be of any size and may accommodate multiple users viewing and touching the display device simultaneously or collaboratively, and in an embodiment, any user may touch any location of the display device.

The storage interface unit 112 supports the attachment of one or more disk drives or direct access storage devices 125 (which are typically rotating magnetic disk drive storage devices, although they could alternatively be other storage devices, including arrays of disk drives configured to appear as a single large storage device to a host computer). In another embodiment, the storage device 125 may be implemented via any type of secondary storage device. The contents of the memory 102, or any portion thereof, may be stored to and retrieved from the storage device 125, as needed. The I/O device interface unit 113 provides an interface to any of various other input/output devices or devices of other types, such as printers or fax machines. The network interface unit 114 provides one or more communications paths from the computer system 100 to other digital devices and computer systems, e.g., the computer system 132; such paths may comprise, e.g., one or more networks 130.

Although the memory bus 103 and the I/O bus 104 are shown in FIG. 1 as a relatively simple structure providing a direct communication path among their link partners, in fact the buses 103, 104 may comprise multiple different buses or communication paths, which may be arranged in any of various forms, such as point-to-point links in hierarchical, star or web configurations, multiple hierarchical buses, parallel and redundant paths, or any other appropriate type of configuration.

In various embodiments, the computer system 100 is a multi-user mainframe computer system, a single-user system, or a server computer or similar device that has little or no direct user interface, but receives requests from other computer systems (clients). In other embodiments, the computer system 100 is implemented as a desktop computer, portable computer, laptop or notebook computer, tablet computer, pocket computer, telephone, smart phone, pager, automobile, teleconferencing system, appliance, or any other appropriate type of electronic device.

The network 130 may be any suitable bus, network, or any multiple or combination thereof, and may support any appropriate protocol suitable for communication of data and/or code to/from the computer system 100 and the computer system 132. In various embodiments, the network 130 may represent a storage device or a combination of storage devices, either connected directly or indirectly to the computer system 100 and the computer system 132. In another embodiment, the network 130 may support wireless communications. In another embodiment, the network 130 may support hard-wired communications, such as a telephone line or cable. In another embodiment, the network 130 may be the Internet and may support IP (Internet Protocol). In another embodiment, the network 130 is implemented as a local area network (LAN) or a wide area network (WAN). In another embodiment, the network 130 is implemented as a hotspot service provider network. In another embodiment, the network 130 is implemented as an intranet. In another embodiment, the network 130 is implemented as any appropriate cellular data network, cell-based radio network technology, or wireless network. In another embodiment, the network 130 is implemented as any suitable bus, network, or any multiple or combination thereof. In some embodiments, the computer system 132 may comprise some or all of the hardware and program components of the computer system 100.

FIG. 1 is intended to depict the representative components of the computer system 100, the network 130, and the computer system 132. However, individual components may have greater complexity than represented in FIG. 1, components other than or in addition to those shown in FIG. 1 may be present, and the number, type, and configuration of such components may vary (e.g., additional memory components, embedded controllers, additional modules, additional network interfaces, etc.). Several particular examples of such additional complexity or additional variations are disclosed herein; these are by way of example only and are not necessarily the only such variations. Moreover, various program components illustrated in FIG. 1 may be implemented in a number of manners, including using various computer applications, routines, components, programs, objects, modules, data structures, etc., and are referred to hereinafter as "computer programs," or simply "programs."

The computer programs comprise one or more instructions or statements that are resident at various times in various memory and storage devices in the computer system 100 and that, when read and executed by one or more processors in the computer system 100 or when interpreted by instructions that are executed by one or more processors, cause the computer system 100 to perform the actions necessary to execute steps or elements comprising the various aspects of embodiments of the invention. Aspects of embodiments of the invention may be embodied as a system, method, or computer program product. Accordingly, aspects of embodiments of the invention may take the form of an entirely hardware embodiment, an entirely program embodiment (including firmware, resident programs, micro-code, etc., which are stored in a storage device) or an embodiment combining program and hardware aspects that may all generally be referred to herein as a "circuit," "module," or "system." Further, embodiments of the invention may take the form of a computer program product embodied in one or more computer-readable medium(s) having computer-readable program code embodied thereon.

Any combination of one or more computer-readable medium(s) may be utilized. The computer-readable medium may be a computer-readable signal medium or a computer-readable storage medium. A computer-readable storage medium, may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage media may comprise: an electrical connection having one or more wires, a portable computer diskette, a hard disk (e.g., the storage device 125), a random access memory (RAM) (e.g., the memory 102), a read-only memory (ROM), an erasable programmable read-only memory (EPROM) or Flash memory, an optical fiber, a portable compact disc read-only memory (CD-ROM), an optical storage device, a magnetic storage device, or any suitable combination of the foregoing. In the context of this document, a computer-readable storage medium may be any tangible medium that can contain, or store, a program for use by or in connection with an instruction execution system, apparatus, or device.

A computer-readable signal medium may comprise a propagated data signal with computer-readable program code embodied thereon, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that communicates, propagates, or transports a program for use by, or in connection with, an instruction execution system, apparatus, or device. Program code embodied on a computer-readable medium may be transmitted using any appropriate medium, including but not limited to, wireless, wire line, optical fiber cable, Radio Frequency, or any suitable combination of the foregoing.

Computer program code for carrying out operations for aspects of embodiments of the present invention may be written in any combination of one or more programming languages, including object oriented programming languages and conventional procedural programming languages. The program code may execute entirely on the user's computer, partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of embodiments of the invention are described below with reference to flowchart illustrations and/or block diagrams of methods, apparatus (systems), and computer program products. Each block of the flowchart illustrations and/or block diagrams, and combinations of blocks in the flowchart illustrations and/or block diagrams may be implemented by computer program instructions embodied in a computer-readable medium. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified by the flowchart and/or block diagram block or blocks. These computer program instructions may also be stored in a computer-readable medium that can direct a computer, other programmable data processing apparatus, or other devices to function in a particular manner, such that the instructions stored in the computer-readable medium produce an article of manufacture, including instructions that implement the function/act specified by the flowchart and/or block diagram block or blocks.

The computer programs defining the functions of various embodiments of the invention may be delivered to a computer system via a variety of tangible computer-readable storage media that may be operatively or communicatively connected (directly or indirectly) to the processor or processors. The computer program instructions may also be loaded onto a computer, other programmable data processing apparatus, or other devices to cause a series of operational steps to be performed on the computer, other programmable apparatus, or other devices to produce a computer-implemented process, such that the instructions, which execute on the computer or other programmable apparatus, provide processes for implementing the functions/acts specified in the flowcharts and/or block diagram block or blocks.

The flowchart and the block diagrams in the figures illustrate the architecture, functionality, and operation of possible implementations of systems, methods, and computer program products, according to various embodiments of the present invention. In this regard, each block in the flowcharts or block diagrams may represent a module, segment, or portion of code, which comprises one or more executable instructions for implementing the specified logical function(s). In some embodiments, the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustration, and combinations of blocks in the block diagrams and/or flow chart illustrations, can be implemented by special purpose hardware-based systems that perform the specified functions or acts, in combinations of special purpose hardware and computer instructions.

Embodiments of the invention may also be delivered as part of a service engagement with a client corporation, nonprofit organization, government entity, or internal organizational structure. Aspects of these embodiments may comprise configuring a computer system to perform, and deploying computing services (e.g., computer-readable code, hardware, and web services) that implement, some or all of the methods described herein. Aspects of these embodiments may also comprise analyzing the client company, creating recommendations responsive to the analysis, generating computer-readable code to implement portions of the recommendations, integrating the computer-readable code into existing processes, computer systems, and computing infrastructure, metering use of the methods and systems described herein, allocating expenses to users, and billing users for their use of these methods and systems. In addition, various programs described hereinafter may be identified based upon the application for which they are implemented in a specific embodiment of the invention. But, any particular program nomenclature that follows is used merely for convenience, and thus embodiments of the invention are not limited to use solely in any specific application identified and/or implied by such nomenclature. The exemplary environments illustrated in FIG. 1 are not intended to limit the present invention. Indeed, other alternative hardware and/or program environments may be used without departing from the scope of embodiments of the invention.

Figure 2:
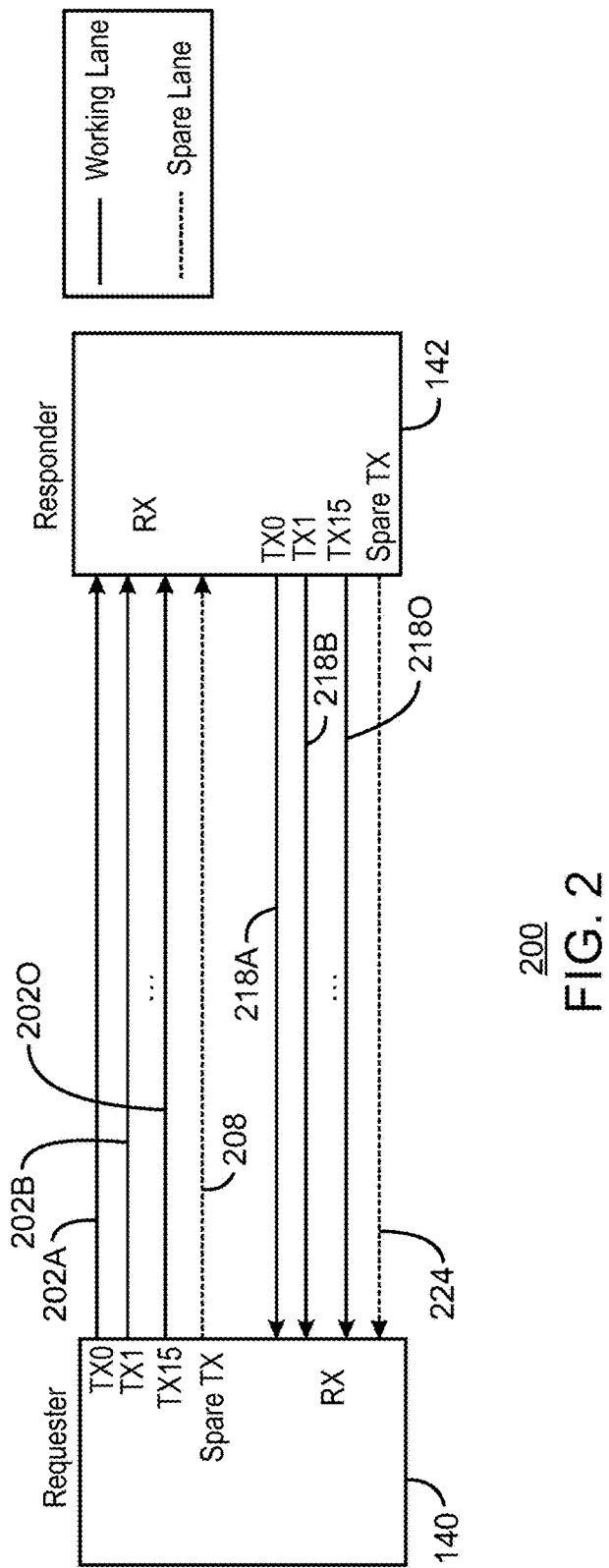
FIG. 2 is an example illustration of data lanes used by the requester module and the responder module.

FIG. 2 illustrates example data lanes used to communicate between the requester module 140 and the responder module 142 according to one embodiment of the invention. In this embodiment, there are sixteen data lanes and one spare lane in each direction, for a total of thirty-four data lanes (only some shown for clarity). The requester module 140 transmits data to the responder module 142 using requestor TX data lanes: "TX 0" 202a, "TX 1" 202b . . . "TX 15" 202o (collectively data lines 202). The requestor's spare TX data lane 208, also referred to herein as a "Spare TX," can transmit any suitable number of data values, and substitute for any one of the other requestor TX lines 202. Similarly, the responder module 142 can transmit data to the requester module 140 using responder TX data lanes "TX 0" 218*a*, "TX 1" 218*b* . . . "TX 15" 218*o* (collectively data lines 218). The responder's spare TX data lane 224 can transmit any suitable number of different data values, and substitute for any one of the other responder TX lines 218.

Figure 3:
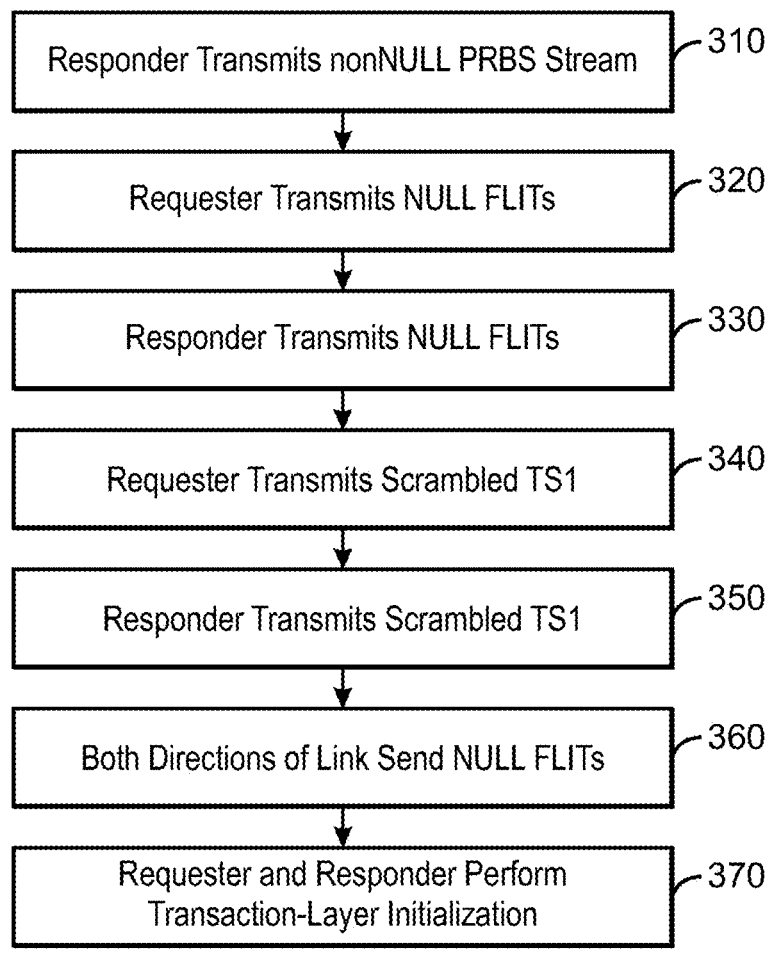
FIG. 3 is an example process flow diagram of a method that can identify a corrupt data lane.

FIG. 3 illustrates one embodiment of a power-on and initialization method suitable for use during link training. This embodiment allows the responder 140 and requestor 142 to determine if any of the data links 202, 218 are corrupt. In operation, the data lanes 202 and 218 transmit a known value, such as a NULL value, during an initialization phase for a period of time less than or equal to a timeout value. Successful receipt of this NULL value may be used to determine that the data lanes 202 and 218 are not corrupt. For example, a NULL value of zero can result in the requester module 140 sending a set of bits with zero values to the responder module 142. If the responder module 142 receives a value other than that NULL value, then the responder module 142 can detect that an error that occurred during transmission.

More specifically, at block 310 in this embodiment, the responder 142 enters its start state and then begins to transmit signals, such as a non-NULL pseudo-random binary stream (also referred to herein as PRBS), to the requester 140. This initial stream is intended to prohibit the requester 140 from acquiring descrambler sync. At block 320, to initialize the responder's 142 descramblers, the requester 140 enters its idle state and issues continuous scrambled NULL 128-bit packets (also referred to herein as FLITs) to the responder 142. In some embodiments, the requester 140 can issue continuous NULL packets of any suitable size to the responder 142. Upon descrambler sync, the responder 142 can also enter the IDLE state and also begin to transmit scrambled NULL FLITs at block 330. It is during these two NULL states, i.e., blocks 320 and 330, that a dead lane can be identified, as the descramblers may not be able to achieve a lock (i.e., descramble NULL flits).

Next, at blocks 340 and 350, the requester 140 and responder 142 can begin issuing scrambled training sequences (also referred to herein as TS 1). At block 360, the requester 140 stops sending training sequences to the responder 142 after the requester 140 has achieved link lock, enters the active state, and starts sending scrambled NULL FLITs. Also at block 360, upon realization that the requester 140 is no longer sending TS1 sequences, the responder 142 stops sending TS1 sequences and enters the active state, also sending scrambled NULL FLITs back to the requester 140. The system is ready for operational packets at block 370. More information about this power on and initialization method can be found below.

Figure 4:
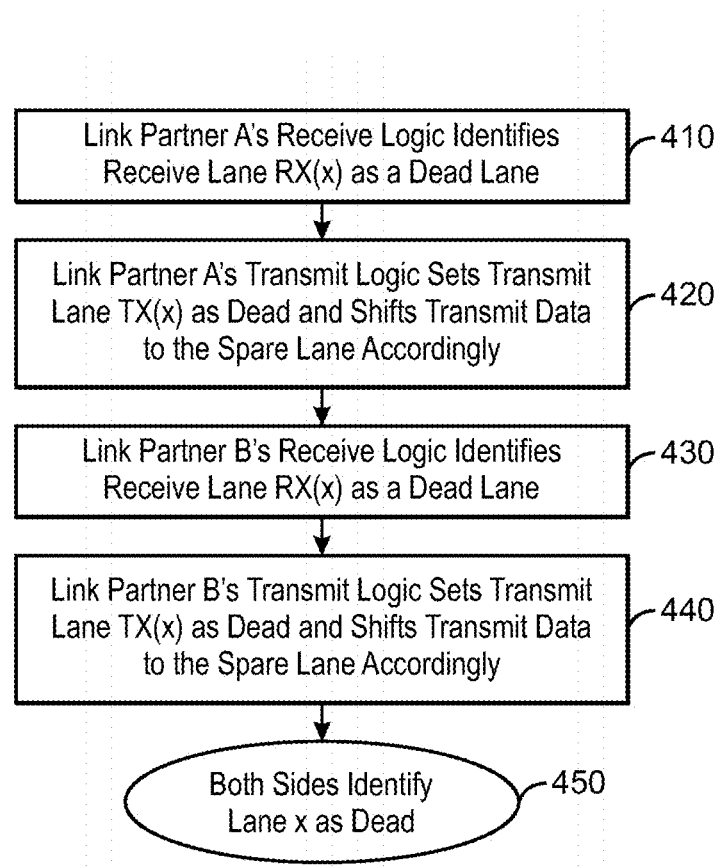
FIG. 4 is an example process flow diagram of a method of communicating a corrupt data lane to a link partner.

FIG. 4 illustrates one method of communicating usage of a spare lane between link partners. In some embodiments, in order to utilize a spare lane instead of a corrupt lane, both link partners 140, 142 must have the same spare lane configuration. Moreover, because the receiver 140, 142 of the corrupt lane can identify that there is a problem, the decision to disable the dead lane and transfer data to the spare lane is communicated to the transmitting link partner 140, 142. One suitable method of communicating that information is, when a receiver 140, 142 identifies a dead lane during the NULL state of the link initialization flow, the receiver 140, 142 shifts its transmitted data to the spare lane based on the number of the RX dead lane and begins transmitting non-NULL signals on the original lane.

More specifically, at block 410, the receive logic at link partner "A" 140, 142 identifies a receive lane RX(x) as being a corrupt lane. One suitable identification test is if the lane has a bit error rate (BER) higher than a defined threshold. In response to the detection of a corrupt lane, receiving link partner "A" 140, 142 sets its transmit lane TX(x) corresponding to the corrupt receive lane as 'dead,' shifts the corresponding transmit lane's data to the spare lane, and intentionally transmits bad data (e.g., a non-NULL signal) to link partner "B" through the transmit lane TX(x) corresponding to the corrupt receive lane, all at block 420. At block 430, receive logic on link partner "B" 140, 142 detects the non-NULL signal, and thus, identifies its receive lane RX(x) (i.e., the corresponding transmit lane for link partner "A" 140, 142) as a dead lane. In response, link partner "B" 140, 142 sets its transmit lane TX(x) as dead (i.e., the original corrupt lane) and also shifts its transmit data to the spare lane. As a result of these blocks, both sides have now identified lane "x" as dead and have begun using the spare lanes.

Figure 5A:
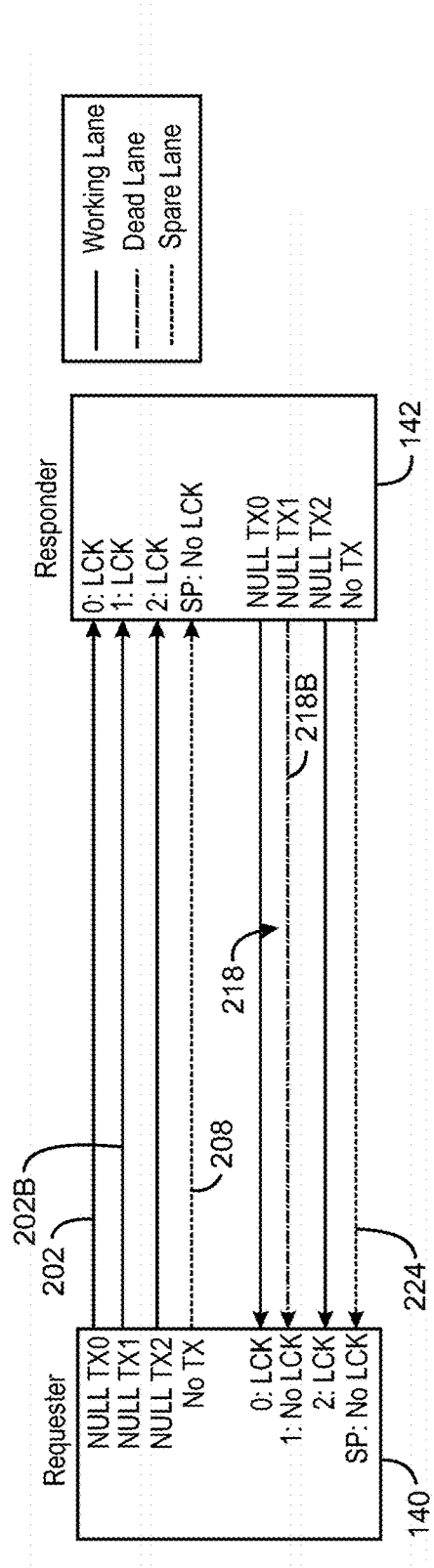
FIGS. 5*a*-5*c* is an example illustration of the method of FIG. 4 in operation.
Figure 5B:
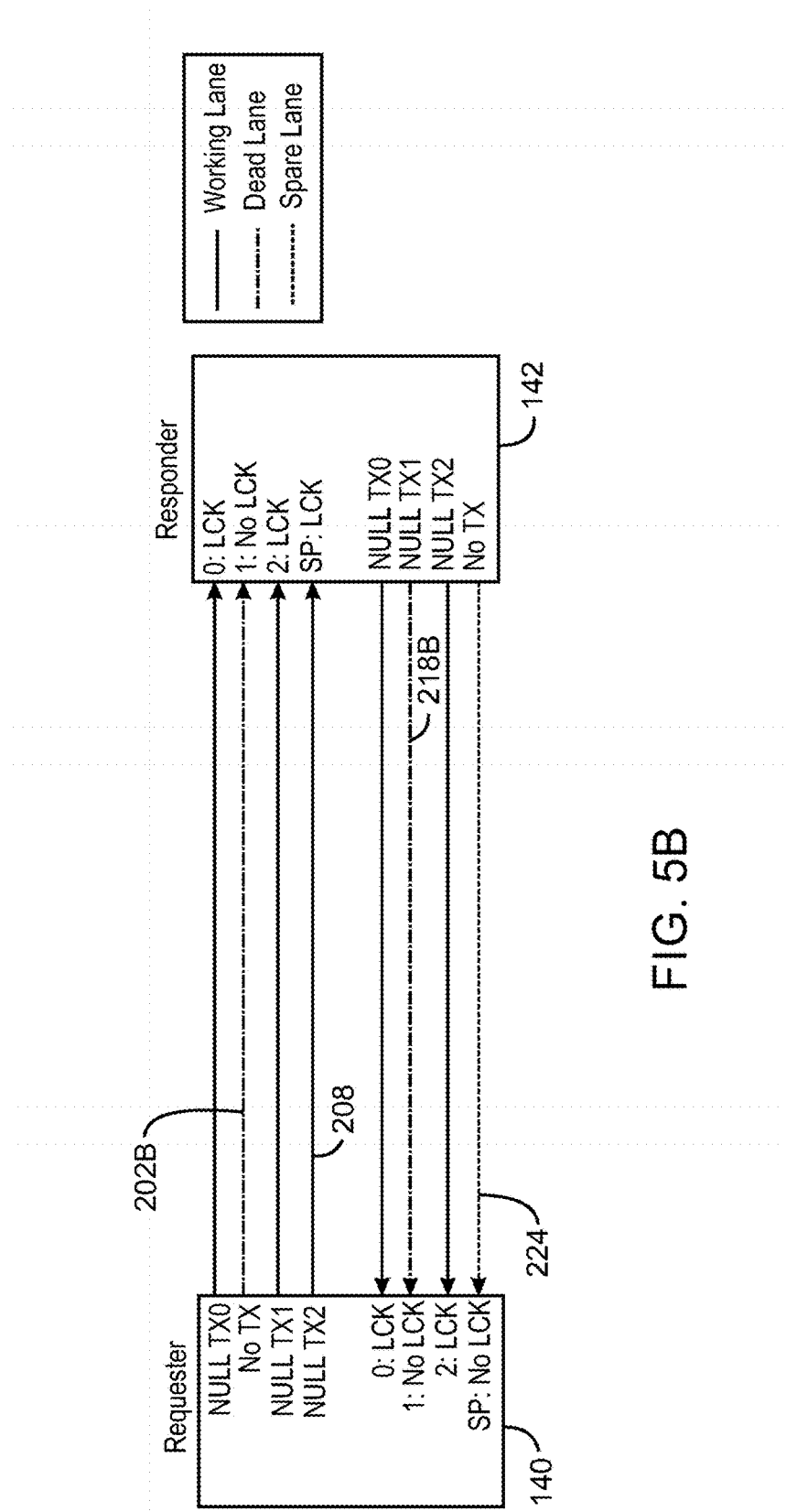
Figure 5C:
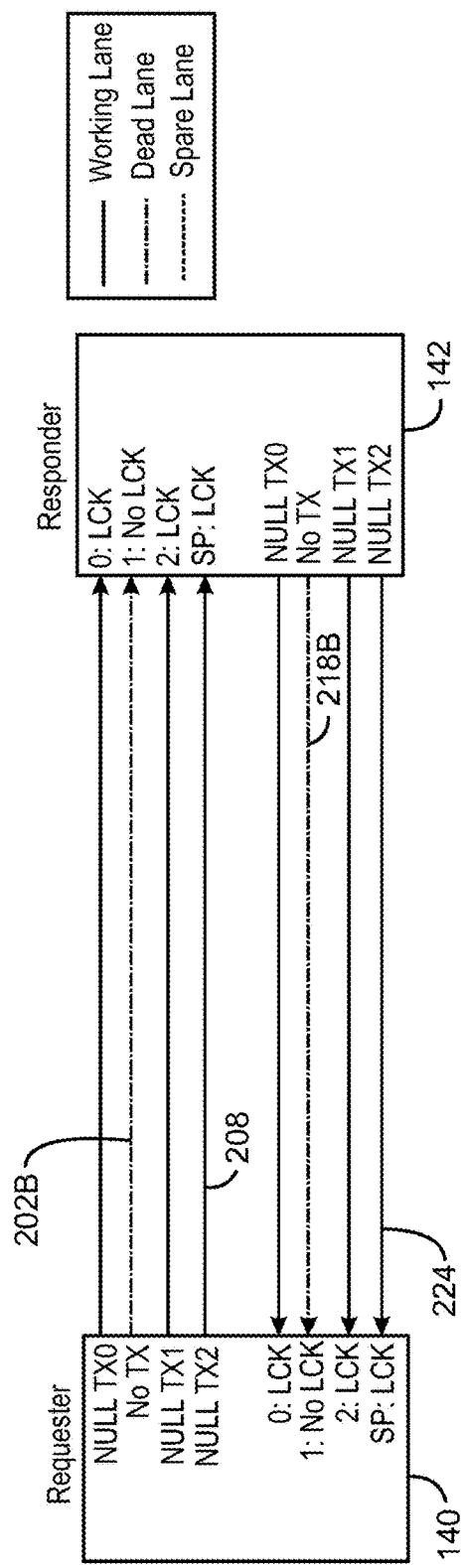

FIGS. 5A-5C collectively illustrate the method in FIG. 4 with reference to an example 3-lane link with one spare lane. In this example, lane 1 transmitted by the responder 142 and received by the requester 140 is not functioning properly (i.e., lane 218*b*). In FIG. 5*a*, the requestor 140 and the responder 142 begin their initialization process by each transmitting a NULL signal over data lines 202 and 218. Because the responder's TX1 line (i.e., 218*b*) is not functioning properly, the requester's 140 de-scrambling logic does not achieve a lock on the NULL data during a defined timeout period. The requestor 140 responds by identifying lane 1 as dead.

In FIG. 5B, the requestor 140 shifts its transmission of data to the spare lane and does not provide good (e.g., NULL) data on its TX lane 1 (i.e., 202*b*). The responder 142, in turn, now identifies that its RX lane 1 (i.e., 202*b*) is a corrupt data lane (also referred to herein as a dead lane). This effectively "kills" lane 1 in both directions (i.e., both 202*b* and 218*b*). For example, the requester 140 and the responder 142 no longer attempt to detect reliable data from lane 1.

In FIG. 5C, the responder 142 reacts to the bad data (e.g., non-NULL data) on lane 1 by diverting transmission of its own data off the corrupt lane 218*b* to the spare lane 224. The requester 140 and the responder 142 now achieve full link lock using the spare lane instead of lane 1. As depicted, when the spare lanes 208, 224 are utilized, each lane with an identifier higher than the identified spare lane is shifted up one number, with the valid lane with the highest identifier becoming the spare lane. For example, if lane 13 is dead, then lane 13 data is transmitted via lane 14, lane 14 data is transmitted on lane 15, and lane 15 data is transmitted on the spare lane. In other embodiments, however, the spare lanes 208, 224 could directly substitute for the dead lane.

Figure 6:
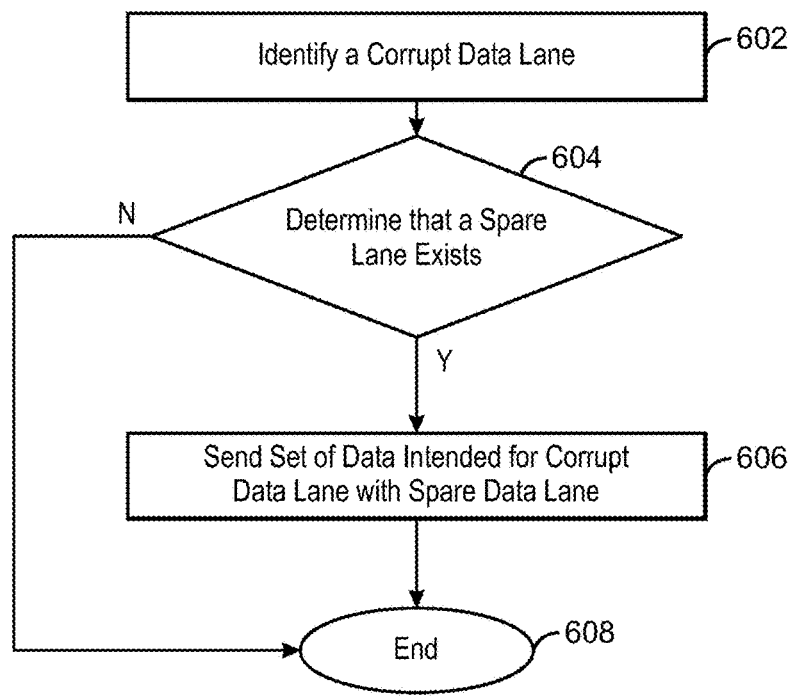
FIG. 6 is an example process flow diagram of a method of using the handshake in FIGS. 4-5 to identify and compensate for a dead data line.

FIG. 6 is an example process flow diagram of a method of using the handshake in FIGS. 4-5 to identify and compensate for a dead data line. The method 600 can be implemented with any suitable computing device, such as the computing device 100 of FIG. 1. At block 602, one of the link partners 140, 142 identifies a corrupt data lane based in part on a timeout value and a null value. As discussed above, in some embodiments, a set of bits with known value, typically NULL, are transmitted within a period of time not to exceed the timeout value. If the set of transmitted bits are not received with those known values, the receiving logic at the other link partner 140, 142 may not lock on the signal. If the receiving link partner 140, 142 fails to lock on a data line, it can mark that data lane as corrupt.

At block 604, the link partner 140, 142 that identified the corrupt link may detect that a spare data lane exists. In some embodiments, that link partner may transmit data to the other link partner 140, 142 using any suitable number of data lanes. If a link partner 140, 142 detects that a spare lane exists, the process flow continues at block 606. If a link partner 140, 142 detects that a spare lane does not exist, the process flow ends at block 608.

At block 606, the link partner 140, 142 that identified the corrupt lane may begin sending data using the spare data lane instead of the corrupt data lane. In this way, the link partner 140, 142 may enable a reliable transmission of data between the requester module 140 and the responder module 142.

Figure 7:
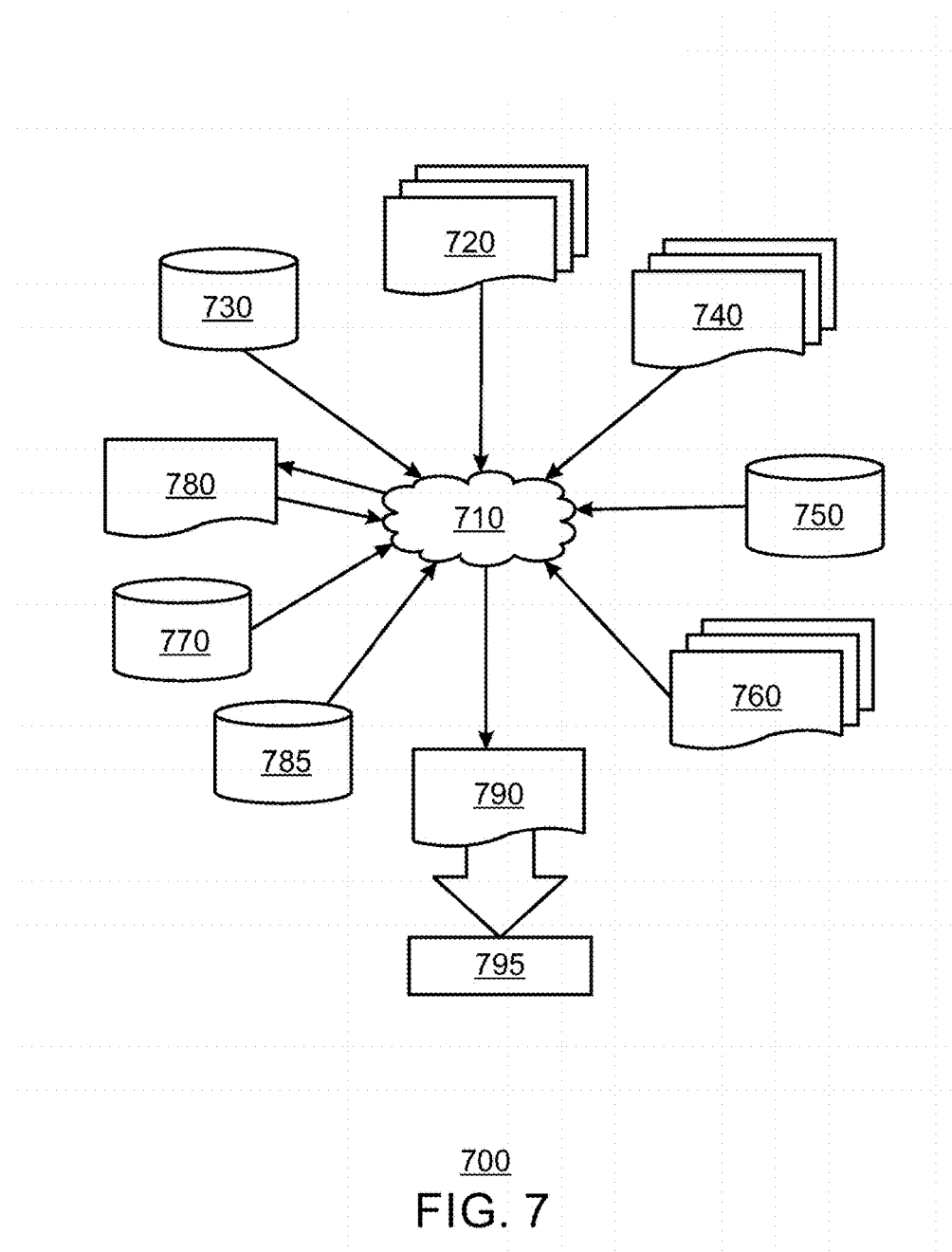
FIG. 7 is a flow diagram of a design process used in semiconductor design, manufacture, and/or test.

FIG. 7 shows a block diagram of an exemplary design flow 700 used for example, in semiconductor IC logic design, simulation, test, layout, and manufacture. Design flow 700 includes processes, machines and/or mechanisms for processing design structures or devices to generate logically or otherwise functionally equivalent representations of the design structures and/or devices described above and shown in the figures attached hereto. The design structures processed and/or generated by design flow 700 may be encoded on machine-readable transmission or storage media to include data and/or instructions that when executed or otherwise processed on a data processing system generate a logically, structurally, mechanically, or otherwise functionally equivalent representation of hardware components, circuits, devices, or systems. Machines include, but are not limited to, any machine used in an IC design process, such as designing, manufacturing, or simulating a circuit, component, device, or system. For example, machines may include: lithography machines, machines and/or equipment for generating masks (e.g. e-beam writers), computers or equipment for simulating design structures, any apparatus used in the manufacturing or test process, or any machines for programming functionally equivalent representations of the design structures into any medium (e.g. a machine for programming a programmable gate array).

Design flow 700 may vary depending on the type of representation being designed. For example, a design flow 700 for building an application specific IC (ASIC) may differ from a design flow 700 for designing a standard component or from a design flow 700 for instantiating the design into a programmable array, for example a programmable gate array (PGA) or a field programmable gate array (FPGA) offered by Altera® Inc. or Xilinx® Inc.

FIG. 7 illustrates multiple such design structures including an input design structure 720 that is preferably processed by a design process 710. Design structure 720 may be a logical simulation design structure generated and processed by design process 710 to produce a logically equivalent functional representation of a hardware device. Design structure 720 may also or alternatively comprise data and/or program instructions that when processed by design process 710, generate a functional representation of the physical structure of a hardware device. Whether representing functional and/or structural design features, design structure 720 may be generated using electronic computer-aided design (ECAD) such as implemented by a core developer/designer. When encoded on a machine-readable data transmission, gate array, or storage medium, design structure 720 may be accessed and processed by one or more hardware and/or software modules within design process 710 to simulate or otherwise functionally represent an electronic component, circuit, electronic or logic module, apparatus, device, or system such as those shown in the figures attached hereto. As such, design structure 720 may comprise files or other data structures including human and/or machine-readable source code, compiled structures, and computer-executable code structures that when processed by a design or simulation data processing system, functionally simulate or otherwise represent circuits or other levels of hardware logic design. Such data structures may include hardware-description language (HDL) design entities or other data structures conforming to and/or compatible with lower-level HDL design languages such as Verilog and VHDL, and/or higher level design languages such as C or C++.

Design process 710 preferably employs and incorporates hardware and/or software modules for synthesizing, translating, or otherwise processing a design/simulation functional equivalent of the components, circuits, devices, or logic structures shown in the figures attached hereto to generate a Netlist 780 which may contain design structures such as design structure 720. Netlist 780 may comprise, for example, compiled or otherwise processed data structures representing a list of wires, discrete components, logic gates, control circuits, I/O devices, models, etc. that describes the connections to other elements and circuits in an integrated circuit design. Netlist 780 may be synthesized using an iterative process in which netlist 780 is resynthesized one or more times depending on design specifications and parameters for the device. As with other design structure types described herein, netlist 780 may be recorded on a machine-readable data storage medium or programmed into a programmable gate array. The medium may be a non-volatile storage medium such as a magnetic or optical disk drive, a programmable gate array, a compact flash, or other flash memory. Additionally, or in the alternative, the medium may be a system or cache memory, buffer space, or electrically or optically conductive devices and materials on which data packets may be transmitted and intermediately stored via the Internet, or other networking suitable means.

Design process 710 may include hardware and software modules for processing a variety of input data structure types including Netlist 780. Such data structure types may reside, for example, within library elements 730 and include a set of commonly used elements, circuits, and devices, including models, layouts, and symbolic representations, for a given manufacturing technology (e.g., different technology nodes, 32 nm, 45 nm, 90 nm, etc.). The data structure types may further include design specifications 740, characterization data 750, verification data 760, design rules 770, and test data files 785 which may include input test patterns, output test results, and other testing information. Design process 710 may further include, for example, standard mechanical design processes such as stress analysis, thermal analysis, mechanical event simulation, process simulation for operations such as casting, molding, and die press forming, etc. One of ordinary skill in the art of mechanical design can appreciate the extent of possible mechanical design tools and applications used in design process 710 without deviating from the scope and spirit of the invention. Design process 710 may also include modules for performing standard circuit design processes such as timing analysis, verification, design rule checking, place and route operations, etc.

Design process 710 employs and incorporates logic and physical design tools such as HDL compilers and simulation model build tools to process design structure 720 together with some or all of the depicted supporting data structures along with any additional mechanical design or data (if applicable), to generate a second design structure 790. Design structure 790 resides on a storage medium or programmable gate array in a data format used for the exchange of data of mechanical devices and structures (e.g. information stored in a ICES, DXF, Parasolid XT, JT, DRG, or any other suitable format for storing or rendering such mechanical design structures). Similar to design structure 720, design structure 790 preferably comprises one or more files, data structures, or other computer-encoded data or instructions that reside on transmission or data storage media and that when processed by an ECAD system generate a logically or otherwise functionally equivalent form of one or more of the embodiments of the invention shown in the figures attached hereto. In one embodiment, design structure 790 may comprise a compiled, executable HDL simulation model that functionally simulates the devices shown in the figures attached hereto.

Design structure 790 may also employ a data format used for the exchange of layout data of integrated circuits and/or symbolic data format (e.g. information stored in a GDSII (GDS2), GL1, OASIS, map files, or any other suitable format for storing such design data structures). Design structure 790 may comprise information such as, for example, symbolic data, map files, test data files, design content files, manufacturing data, layout parameters, wires, levels of metal, vias, shapes, data for routing through the manufacturing line, and any other data required by a manufacturer or other designer/developer to produce a device or structure as described above and shown in the figures attached hereto. Design structure 790 may then proceed to a stage 795 where, for example, design structure 790: proceeds to tape-out, is released to manufacturing, is released to a mask house, is sent to another design house, is sent back to the customer, etc.

Some embodiments of the present invention may be implemented as part of devices that comply with the Hybrid Memory Cube Specification version 1.0. For example, some embodiments described herein may comply with portions of the Hybrid Memory Cube Specification, which state, in part, that the "architecture includes 17 data lanes (including one spare) and the single forwarded clock." In some embodiments, techniques described herein can be implemented with architecture that includes any suitable number of data lanes and spare data lanes.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Therefore, it is desired that the embodiments described herein be considered in all respects as illustrative, not restrictive, and that reference be made to the appended claims for determining the scope of the invention.

What is claimed is:

1. A system for coordinating spare lane usage between link partners, comprising:
   a memory having a set of computer readable computer instructions, and
   a processor for executing the set of computer readable instructions, the set of computer readable instructions including:
   analyzing data from a link partner to identify a corrupt lane;
   communicating the corrupt lane to the link partner, wherein the communication does not require a sideband communication channel, and wherein communicating the corrupt lane to the link partner comprises:
   identifying a transmit lane corresponding to the corrupt lane;
   transmitting a set of data intended for the transmit lane corresponding to the corrupt using a spare data lane; and
   transmitting bad data to the link partner using the transmit lane corresponding to the corrupt lane.

2. The system of claim 1, wherein the bad data identifies the corrupt lane to the link partner.

3. The system of claim 1, wherein the corrupt lane and the spare data lane transmit data using the hybrid memory cube protocol.

4. The system of claim 1, further comprising transmitting known data values to the link partner during an initialization phase.

5. The system of claim 4, wherein the corrupt lane comprises a data lane in which the known data values are modified during transmission.

6. The system of claim 1, wherein the spare data lane comprises a data lane which does not initially transmit data.

7. A system for coordinating spare lane usage between link partners, comprising:
   a memory having a set of computer readable computer instructions, and
   a processor for executing the set of computer readable instructions, the set of computer readable instructions including:
   receiving a first set of data from a link partner on a plurality of data lanes;
   detecting a corrupt receive lane in the plurality of data lanes; and
   identifying the corrupt receive lane to the link partner using the plurality of data lanes, wherein identifying the corrupt receive lane to the link partner comprises:
   identifying a transmit lane corresponding to the corrupt data lane;
   transmitting a set of data intended for the transmit lane corresponding to the corrupt data lane using a spare data lane; and
   transmitting corrupted data to the link partner using the transmit lane corresponding to the corrupt data lane.

8. The system of claim 7, wherein the plurality of data lanes comprise a matched set of directional data lanes.

9. The system of claim 8, wherein the plurality of data lanes transmit data using the hybrid memory cube protocol.

10. The system of claim 7, wherein the corrupt data lane comprises a data lane in which data values are modified during transmission.

11. The system of claim 7, wherein the spare data lane comprises a data lane which does not initially transmit data.

12. A system for coordinating spare lane usage between link partners without a sideband communication channel, the system comprising:
   a memory having a set of computer readable computer instructions, and
   a processor for executing the set of computer readable instructions, the set of computer readable instructions including:
   receiving initialization data from a link partner;
   identifying a corrupt lane by comparing the received initialization data to predetermined values;

identifying a transmit lane corresponding to the corrupt lane;

diverting data from the identified corresponding transmit lane to a spare data lane; and transmitting bad data to the link partner using the identified corresponding transmit lane to communicate the corrupt lane to the link partner.

* * * * *